United States Patent
Takahashi et al.

(10) Patent No.: US 7,623,788 B2
(45) Date of Patent: Nov. 24, 2009

(54) OPTICAL WAVELENGTH DIVISION MULTIPLEXING TRANSMITTER

(75) Inventors: Ryuta Takahashi, Hitachi (JP); Koji Kumagai, Hitachi (JP); Akihiro Hiruta, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 564 days.

(21) Appl. No.: 11/260,478

(22) Filed: Oct. 28, 2005

(65) Prior Publication Data

US 2006/0210219 A1 Sep. 21, 2006

(30) Foreign Application Priority Data

Mar. 16, 2005 (JP) ............................. 2005-075035

(51) Int. Cl.
 *H04J 14/02* (2006.01)
 *G02B 27/10* (2006.01)
(52) U.S. Cl. .............................. 398/82; 398/86; 398/88; 359/629
(58) Field of Classification Search .................... 398/82, 398/86–88; 359/629
See application file for complete search history.

(56) References Cited

U.S. PATENT DOCUMENTS

| 6,542,306 | B2 * | 4/2003 | Goodman | 359/634 |
| 7,184,621 | B1 * | 2/2007 | Zhu | 385/24 |
| 7,263,291 | B2 * | 8/2007 | Mahgerefteh et al. | 398/82 |
| 2003/0206688 | A1 * | 11/2003 | Hollars et al. | 385/24 |

FOREIGN PATENT DOCUMENTS

| JP | 2003-014994 A | 1/2003 |
| JP | 2003-195119 A | 7/2003 |

* cited by examiner

*Primary Examiner*—Nathan M Curs
(74) *Attorney, Agent, or Firm*—Foley & Lardner LLP (57) ABSTRACT

An optical transmitter for coupling and wavelength-multiplexing optical signals with a different wavelength has 3 or more light sources for emitting parallel optical signals with a different wavelength, and 2 kinds of optical components with a different optical signal reflectance arranged in an optical path of each light source for coupling into one the optical signals emitted from the light sources respectively. The reflectance or transmittance of each of the 2 kinds of optical components is set so that each optical signal has the same optical signal power when reflected off or transmitted through the optical components for being coupled together and output from the optical transmitter.

12 Claims, 6 Drawing Sheets

OPTICAL WAVELENGTH DIVISION MULTIPLEXING TRANSMITTER

The present application is based on Japanese patent application No. 2005-075035, the entire contents of which are incorporated herein by reference.

BACKGROUND OF THE INVENTION

1. Field of the Invention

The present invention relates to an optical transmitter used in wavelength division multiplexing optical communications, and particularly, to an optical transmitter for coupling and wavelength-multiplexing optical signals with a different wavelength by means of reflective and transmissive optical components.

2. Description of the Related Art

In the field of optical communications, the prevailing optical transmission method that expands information capacity is that by wavelength division multiplexing (WDM), in which a plurality of signals are carried by light of separate wavelengths, each of which is multiplexed and transmitted through one optical fiber.

Figure 2:
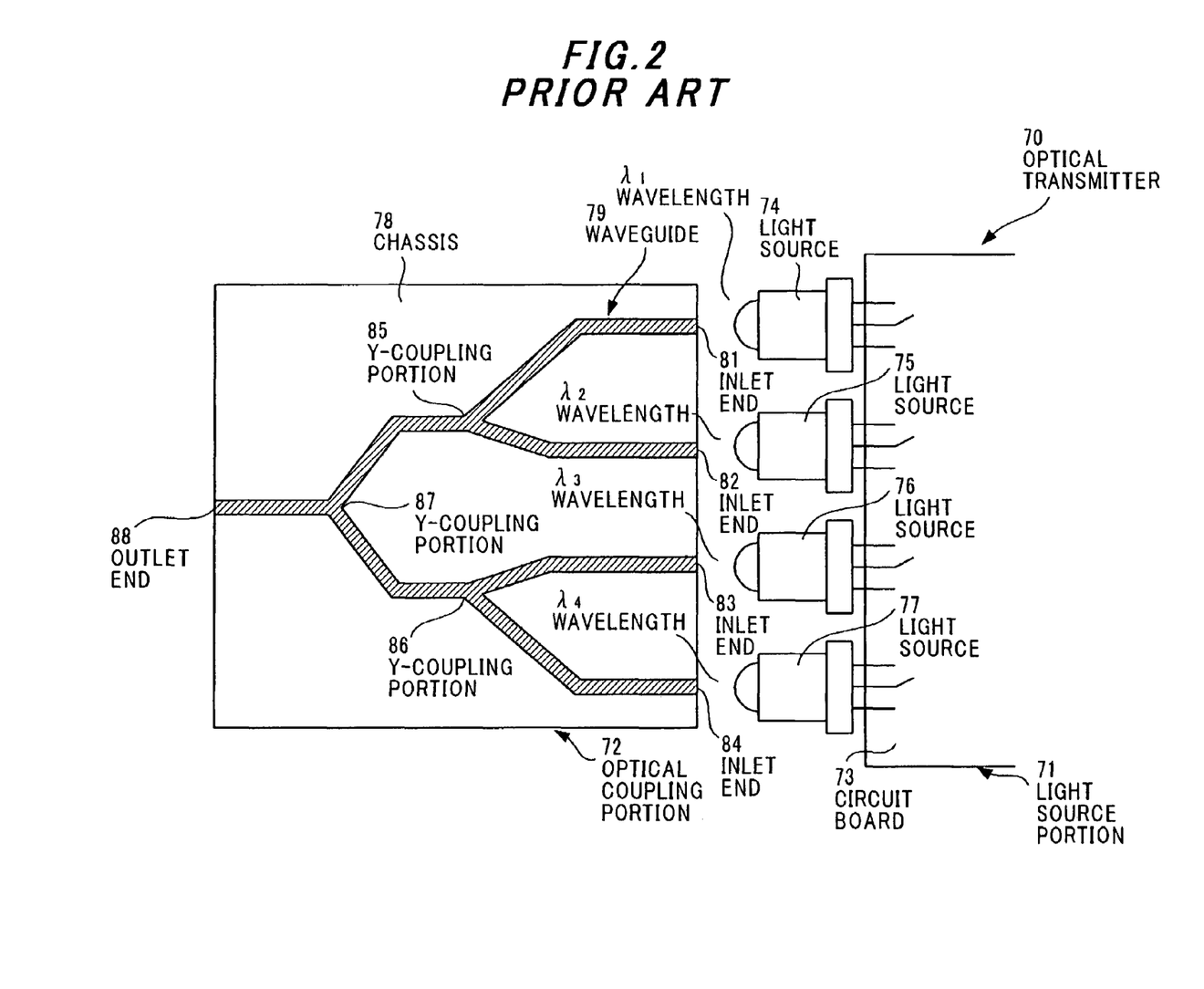
FIG. 2 is a schematic view illustrating an optical transmitter using a planar waveguide optical coupler.

FIG. 2 is a schematic view illustrating an optical transmitter using a waveguide optical coupler.

As shown in FIG. 2, an optical transmitter 70 comprises a light source portion 71 and an optical coupling portion 72. The light source portion 71 comprises a circuit board 73, and 4 light sources 74-77 arranged with a specified spacing. On the circuit board 73, there are packaged an IC, and electronic components such as a resistor, capacitor, etc., not shown, for controlling optical power of the light sources 74-77. The optical coupling portion 72 comprises a planar waveguide optical coupler, in which 2 cores extending from 4 inlet ends 81-84 are coupled together in Y-coupling portions 85 and 86, and in which the coupled waveguides are coupled together in a Y-coupling portion 87, and communicate with an outlet end 88.

Optical signals with a different wavelength from the light sources 74-77 are respectively passed into the 4 inlet ends 81-84, and combined together in the Y-coupling portions 85-87, and a wavelength multiplexing optical signal with the 4 different wavelengths combined together is emitted from the outlet end 88.

Because the optical transmitter 70 comprises the light source portion 71 and the planar waveguide optical coupling portion 72, it has fewer components and simple structure (See JP-A-2003-14994, for example).

However, because the optical transmitter 70 has the planar waveguide optical coupler formed as the optical coupling portion 72, its polarization-dependent loss of optical signals propagating through the waveguide becomes large. Also, because the optical transmitter 70 has the planar waveguide optical coupling portion 72, it has a low manufacturing yield. In the case of an optical transmitter for a 4-wavelength multiplexing optical signal, since there are packaged 4 LDs as the light sources 71-74, the spacing between the waveguides of the optical coupling portion 72 has to be large, which results in a large-size optical coupling portion 72 and therefore a high cost.

Figure 1:
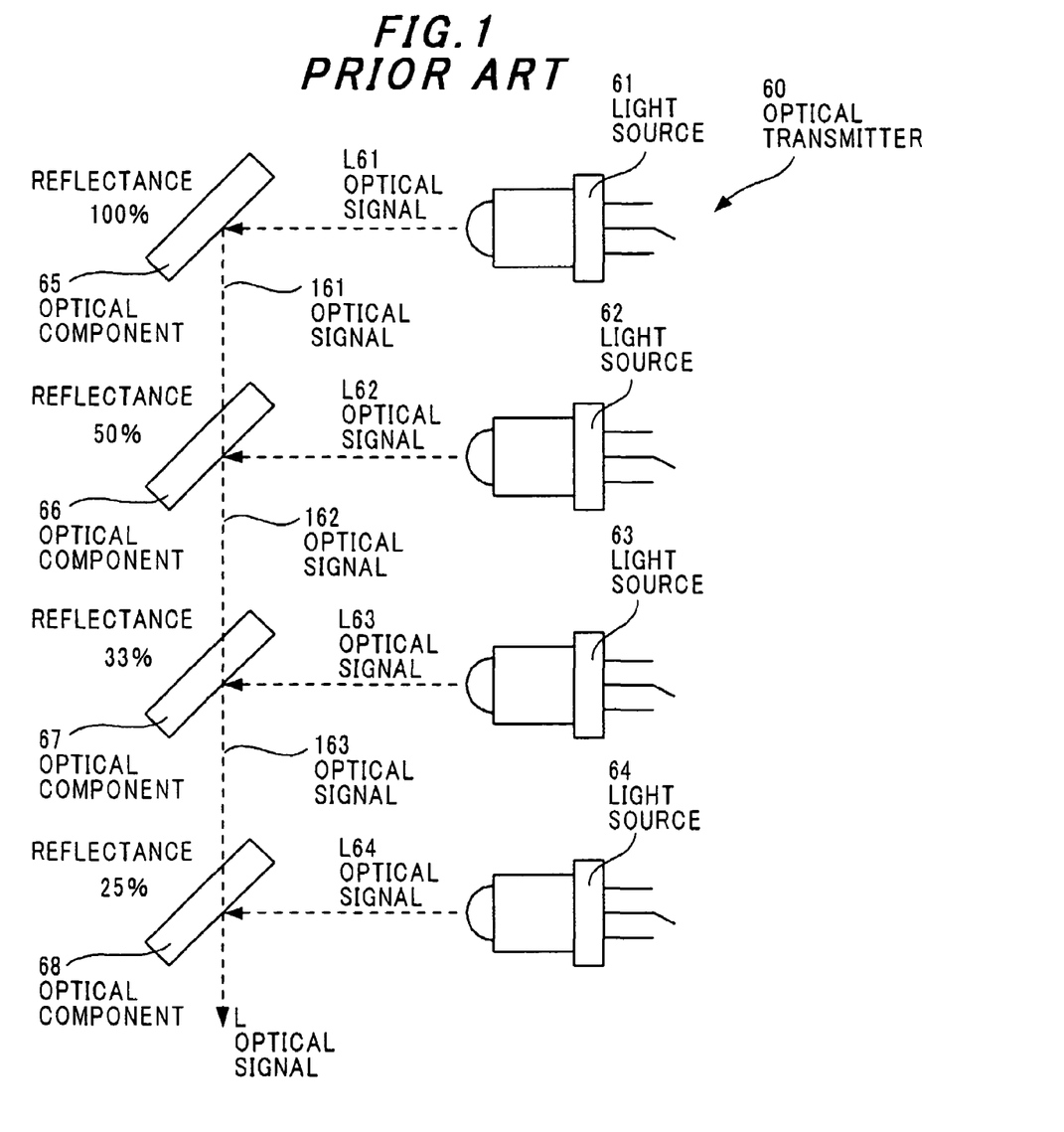
FIG. 1 is a schematic view of a conventional optical transmitter.

Accordingly, there is an optical transmitter 60 for coupling optical signals using optical components, as shown in FIG. 1.

The optical transmitter 60 comprises 4 light sources 61-64 formed in an array for emitting respective parallel optical signals L61-L64 with a different wavelength, and respective optical components 65-68 arranged in a line in an optical path of the optical signal emitted from each light source.

The optical component 65 arranged in the optical path of the optical signal L61 reflects the optical signal L61 emitted from the light source 61. The optical component 66 arranged in the optical path of the optical signal L62 not only reflects the optical signal L62, but also transmits an optical signal 161 reflected by the optical component 65 to couple the optical signals L62 and 161. The optical component 67 arranged in the optical path of the optical signal L63 not only reflects the optical signal L63, but also transmits the optical signal 162 coupled at the optical component 66 to couple the optical signals L63 and 162. The optical component 68 arranged in the optical path of the optical signal L64 not only reflects the optical signal L64, but also transmits the optical signal 163 coupled at the optical component 67 to couple the optical signals L64 and 163. An optical signal L coupled at the optical component 68 is emitted as a 4-wavelength multiplexing optical signal.

Here, to equalize optical signal power of each optical signal L61-L64 of the optical signal L coupled at the optical component 68, the reflectivity of the optical component 65 is 100%, the reflectivity of the optical component 66 is 50%, the reflectivity of the optical component 67 is 33%, and the reflectivity of the optical component 68 is 25%.

For the optical signal L61, 100% of optical signal power is reflected at the optical component 65, 50% thereof is transmitted at the optical component 66, 67% thereof is transmitted at the optical component 67, and 75% thereof is transmitted at the optical component 68, to be coupled to the other optical signals L62, L63 and L64. Therefore, the optical signal power of the optical signal L61 transmitted through the optical component 68 is:

$$1 \times 0.5 \times 0.67 \times 0.75 = 0.25,$$

which is 25% of optical signal power of the light source 61.

For the optical signal L62, 50% of optical signal power is reflected at the optical component 66, 67% thereof is transmitted at the optical component 67, and 75% thereof is transmitted at the optical component 68, to be coupled to the other optical signals L61, L63 and L64. Therefore, the optical signal power of the optical signal L62 transmitted through the optical component 68 is:

$$0.5 \times 0.67 \times 0.75 = 0.25,$$

which is 25% of optical signal power of the light source 62.

For the optical signal L63, 33% of optical signal power is reflected at the optical component 67, and 75% thereof is transmitted at the optical component 68, to be coupled to the other optical signals L61, L62 and L64. Therefore, the optical signal power of the optical signal L63 transmitted through the optical component 68 is:

$$0.33 \times 0.75 = 0.25,$$

which is 25% of optical signal power of the light source 63.

For the optical signal L64, 25% of optical signal power is reflected at the optical component 68, to be coupled to the other optical signals L61, L62 and L63.

In this manner, the 4-wavelength multiplexing optical signal L consists of a signal in which 25% of each optical signal L61-L64 is coupled. And the optical transmitter 60 wavelength-multiplexes optical signal power of each wavelength equally by making the reflectance of the optical components 65-68 different.

However, because in the optical transmitter 60 shown in FIG. 1, equalizing wavelength-multiplexed optical signal power requires making the respective reflectance of each optical component 65-68 different, there is the problem that there are many kinds of optical components used, which therefore results in a high manufacturing cost.

The other related art is for example JP-A-2003-195119.

SUMMARY OF THE INVENTION

Accordingly, it is an object of the present invention to provide an optical transmitter for obviating the above problem, which is capable of wavelength-multiplexing with a small number of kinds of optical components, and equalizing wavelength-multiplexed optical signal power.

In accordance with one aspect of the invention, an optical transmitter for coupling and wavelength-multiplexing optical signals with a different wavelength comprises:

3 or more light sources for emitting parallel optical signals with a different wavelength; and 2 kinds of optical components with a different optical signal reflectance arranged in an optical path of each light source for coupling into one the optical signals emitted from the light sources respectively, wherein:

the reflectance or transmittance of each of the 2 kinds of optical components is set so that each optical signal has the same optical signal power when reflected off or transmitted through the optical components for being coupled together and output from the optical transmitter.

It is preferred that the optical components comprise a reflective optical component and a coupling optical component for coupling together optical signals emitted from 2 light sources respectively, and a reflective optical component and a coupling optical component for subsequently coupling these coupled optical signals together, when coupling the respective optical signals of the 3 or more light sources into one.

It is preferred that, in coupling 2 optical signals together, a first optical signal is reflected off a reflective optical component, and subsequently transmitted through a coupling optical component, while a second optical signal is reflected off the coupling optical component for being coupled to the first optical signal.

It is preferred that the respective reflectances y and x of the reflective optical component and the coupling optical component satisfy the following relation: $y=x/(1-x)$, $0<x \leq 0.5$.

It is preferred that, in coupling 2 optical signals together, a first optical signal is reflected off a reflective optical component, and subsequently reflected off a coupling optical component, while a second optical signal is transmitted through the coupling optical component for being coupled to the first optical signal.

It is preferred that the respective reflectances y and x of the reflective optical component and the coupling optical component satisfy the following relation: $y=(1-x)/x$, $0.5 \leq x<1$.

It is preferred that the reflectance y of the reflective optical component is 1, and that the reflectance x of the coupling optical component is 0.5.

It is preferred that respective optical signals of 4 light sources are combined into one for 4-wavelength multiplexing.

It is preferred that the optical transmitter further comprises:

a first, second, third, and fourth light source arranged in an array for emitting respectively a first, second, third, and fourth parallel optical signal with a different wavelength;

a first reflective optical component for reflecting the first optical signal of the first light source;

a first coupling optical component for reflecting the second optical signal of the second light source adjacent to the first light source and transmitting the first optical signal reflected off the first reflective optical component for coupling the first and the second optical signal;

a second reflective optical component for reflecting the fourth optical signal of the fourth light source;

a second coupling optical component for reflecting the third optical signal of the third light source adjacent to the fourth light source and transmitting the fourth optical signal reflected off the second reflective optical component for coupling the third and the fourth optical signal;

a third reflective optical component for reflecting the third and the fourth optical signal coupled by the second coupling optical component; and a third coupling optical component for transmitting the first and the second optical signal coupled by the first coupling optical component, and reflecting the third and the fourth optical signal reflected off the third reflective optical component for coupling the first to the fourth optical signals, wherein:

the reflectance of each of the first to the third reflective optical component is 1; and the reflectance of each of the first to the third coupling optical component is 0.5.

It is preferred that the optical transmitter further comprises:

a first, second, third, and fourth light source arranged in an array for emitting respectively a first, second, third, and fourth parallel optical signal with a different wavelength;

a first reflective optical component for reflecting the first optical signal of the first light source;

a first coupling optical component for reflecting the second optical signal of the second light source adjacent to the first light source and transmitting the first optical signal reflected off the first reflective optical component for coupling the first and the second optical signal;

a second reflective optical component for reflecting the third optical signal of the third light source;

a second coupling optical component for transmitting the fourth optical signal of the fourth light source adjacent to the third light source and reflecting the third optical signal reflected off the second reflective optical component for coupling the third and the fourth optical signal; and a third coupling optical component for transmitting the first and the second optical signal coupled by the first coupling optical component, and reflecting the third and the fourth optical signal coupled by the second coupling optical component for coupling the first to the fourth optical signals, wherein:

the reflectance of each of the first and the second reflective optical component is 1; and the reflectance of each of the first to the third coupling optical component is 0.5.

It is preferred that the optical transmitter further comprises:

a first, second, third, and fourth light source arranged in an array for emitting respectively a first, second, third, and fourth parallel optical signal with a different wavelength;

a first reflective optical component for reflecting the first optical signal of the first light source;

a first coupling optical component for reflecting the second optical signal of the second light source adjacent to the first light source and transmitting the first optical signal reflected off the first reflective optical component for coupling the first and the second optical signal;

a second reflective optical component for reflecting the fourth optical signal of the fourth light source;

a second coupling optical component for reflecting the third optical signal of the third light source adjacent to the fourth light source and transmitting the fourth optical signal reflected off the second reflective optical component for coupling the third and the fourth optical signal;

a third reflective optical component for reflecting the third and the fourth optical signal coupled by the second coupling optical component; and a third coupling optical component for reflecting the first and the second optical signal coupled by the first coupling optical component, and transmitting the third and the fourth optical signal reflected off the third reflective optical component for coupling the first to the fourth optical signals.

The present invention exhibits the excellent effect of being capable of wavelength-multiplexing with fewer kinds of optical components, and equalizing wavelength-multiplexed optical signal power.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 3:
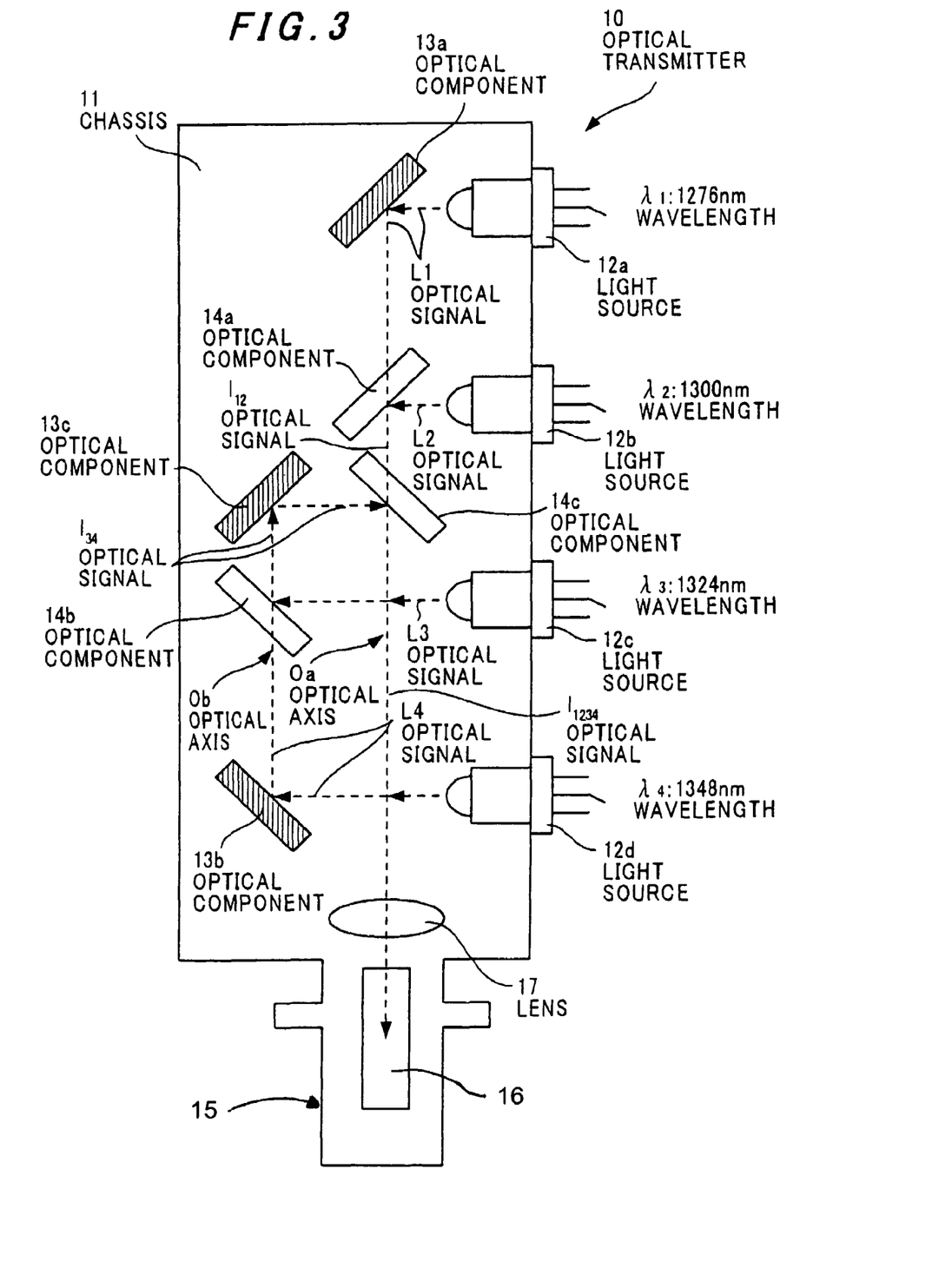
FIG. 3 is a schematic view illustrating an optical transmitter according to a first preferred embodiment of the invention.

FIG. 3 is a schematic view illustrating an optical transmitter according to a first preferred embodiment of the invention.

As shown in FIG. 3, an optical transmitter 10 according to an embodiment of the invention comprises a chassis 11, a plurality of light sources 12a-12d arranged in an array inside or outside of the chassis 11 for emitting parallel optical signals with a different wavelength, and optical components 13a-13c for reflecting optical signals, and optical components 14a-14c for coupling optical signals.

The light sources 12a-12d emit equal optical signal power of respective optical signals and are fixed to one side of the chassis 11 (the right side in the figure) with a constant spacing therebetween.

On the other side of the chassis 11 (the lower side in the figure), there is formed a receptacle 15 for outputting outwardly a wavelength multiplexing optical signal. Inside the receptacle 15, there is provided a ferrule 16. An optical fiber (not shown) for transmitting outwardly the wavelength multiplexing optical signal is inserted in the ferrule 16. Adjacent to the receptacle 15, there is provided a lens 17 for condensing optical signals to the end face of the ferrule 16.

The optical transmitter 10 uses the plurality of 2 kind optical signal reflectance optical components 13a-13c and 14a-14c, so that the reflective optical components 13a-13c and the coupling optical components 14a-14c are arranged to combine optical signals emitted from each light source 12a-12d into one optical signal with equal optical signal power.

Figure 4:
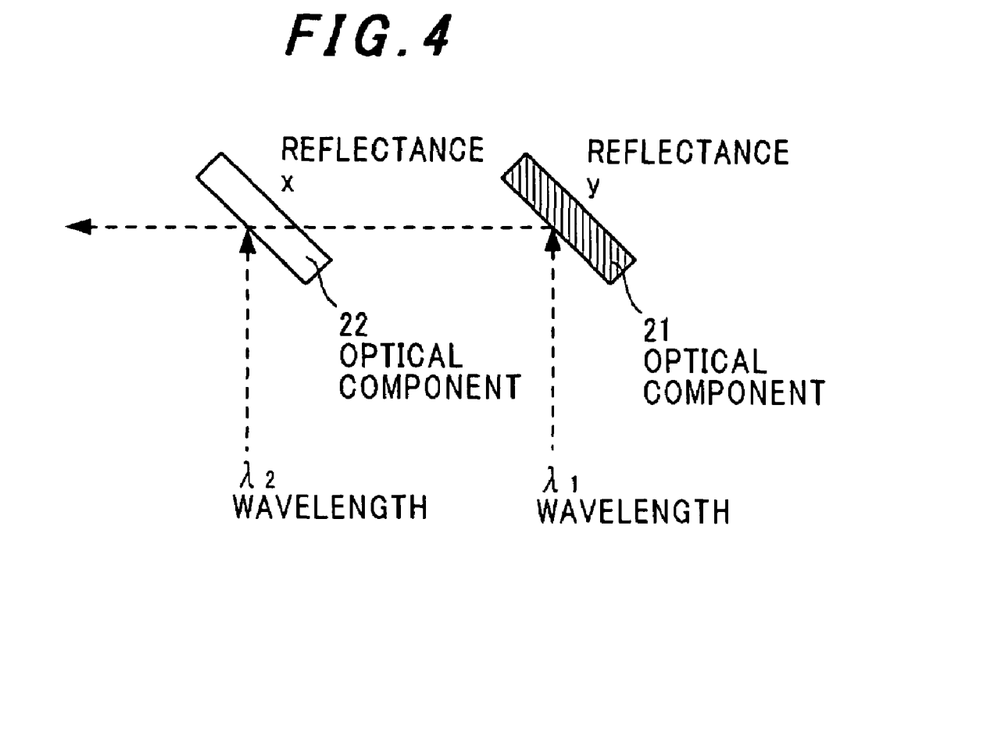
FIG. 4 is a diagram for explaining the relationship between reflectances of two kinds of optical components.
Figure 5:
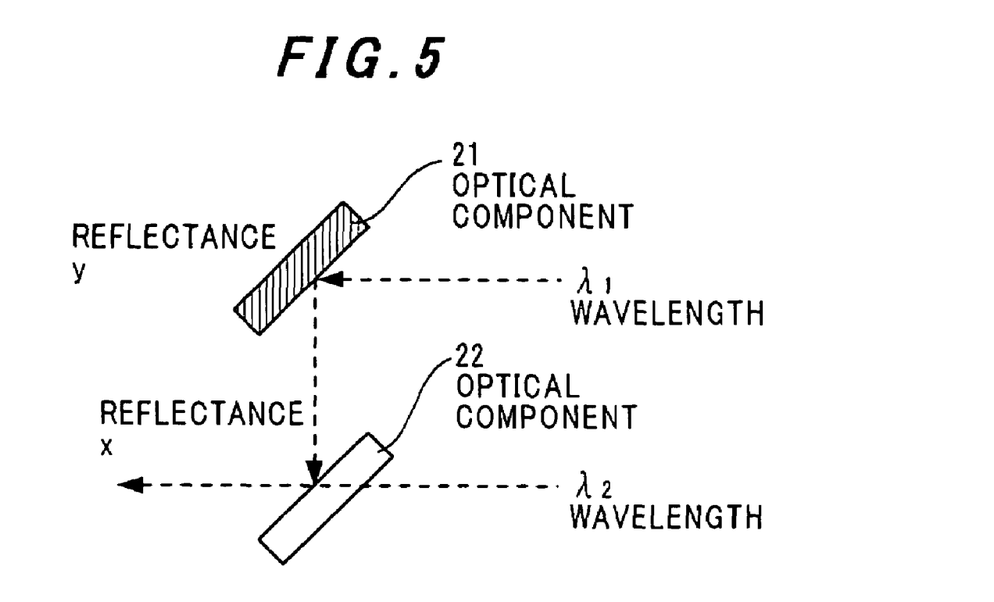
FIG. 5 is a diagram for explaining the relationship between reflectances of two kinds of optical components.

Referring to FIGS. 4 and 5, here are explained the reflectances of a reflective optical component 21 and a coupling optical component 22 required for equalizing and coupling optical signal power of 2 optical signals.

As shown in FIG. 4, optical signals of wavelength $\lambda_1$ and $\lambda_2$ are passed through the reflective optical component 21 and the coupling optical component 22 respectively. The optical signal of wavelength $\lambda_1$ reflects at the reflective optical component 21 and transmits through the coupling optical component 22, while the optical signal of wavelength $\lambda_2$ reflects at the coupling optical component 22 so that both the signals are coupled at the coupling optical component 22. In order to equalize optical signal power at a coupling point, let the reflectances of the reflective optical component 21 and the coupling optical component 22 be y and x respectively, then the reflectances of the optical components are set to have the relationship between x and y expressed in the following equation (1):

$$y = x/(1-x) \quad (1)$$

It should be noted that the reflectance x of the coupling optical component 22 is set within the range of $0 < x \leq 0.5$ so that the reflectance y of the reflective optical component 21 does not exceed 1.

Let optical signal power of the wavelength $\lambda_1$ and $\lambda_2$ optical signals both be I, then optical signal power I of the wavelength $\lambda_1$ is y×I by reflection at the reflective optical component 21, and y×(1−x)×I=xI after transmission through the coupling optical component 22. Also, optical signal power I of the wavelength $\lambda_2$ is xI by reflection at the coupling optical component 22.

Thus by setting each reflectance of the reflective optical component 21 and the coupling optical component 22 to satisfy equation (1), optical signals can be coupled so that the coupling ratio of 2 optical signals can be equalized.

As shown in FIG. 5, optical signals of wavelength $\lambda_1$ and $\lambda_2$ are passed through the reflective optical component 21 and the coupling optical component 22 respectively. The optical signal of wavelength $\lambda_1$ reflects at the reflective optical component 21 and the coupling optical component 22, while the optical signal of wavelength $\lambda_2$ transmits through the coupling optical component 22 and is coupled to the optical signal of wavelength $\lambda_1$ at the coupling optical component 22.

In this embodiment of FIG. 5, in order to equalize optical signal power at a coupling point, let the reflectances of the reflective optical component 21 and the coupling optical component 22 be y and x respectively, then the reflectances of the optical components are set to have the relationship between x and y expressed in the following equation (2):

$$y = (1-x)/x \quad (2)$$

It should be noted that the reflectance x of the coupling optical component 22 is set within the range of $0.5 \leq x < 1$ so that the reflectance y of the reflective optical component 21 does not exceed 1.

Similarly to FIG. 4, let optical signal power of the optical signals passed through the reflective optical component 21 and the coupling optical component 22 both be I, then optical signal power I of the wavelength $\lambda_1$ is y×I after reflection at the reflective optical component 21, and y×x×I=(1−x)I after transmission through the coupling optical component 22. On the other hand, optical signal power I of the wavelength $\lambda_2$ is (1−x) I after transmission through the coupling optical component 22. Thus by setting each reflectance of the reflective optical component 21 and the coupling optical component 22 to satisfy equation (2), optical signals can be coupled so that the coupling ratio of 2 optical signals can be equalized.

In equation (1) or (2), let the reflectances of the reflective optical component 21 and the coupling optical component 22 be 100% and 50% respectively, then the coupling optical signal power of the coupled optical signals can be maximized to 50%.

Returning to FIG. 3, the arrangement of optical components of the optical transmitter 10 of the present embodiment will be explained.

First, let the optical axis of the ferrule 16 and the lens 17 at the outlet end of wavelength-multiplexing optical signals be an optical axis Oa, and then let the light sources 12a-12d arranged in an array be a first, second, third, and fourth light source 12a, 12b, 12c, and 12d sequentially towards the receptacle 15.

In the optical axis Oa, there is arranged a first reflective optical component 13a for reflecting an optical signal L1 emitted from the first light source 12a so that its reflection surface is inclined at 450 to the optical axis Oa, and meets the optical axis of the first light source 12a.

In this optical axis Oa, there is arranged a first coupling optical component 14a for reflecting an optical signal L2 emitted from the second light source 12b so that its reflection surface is inclined at 45° to the optical axis Oa, and meets the optical axis of the second light source 12b. This allows the first coupling optical component 14a to transmit the optical signal L1 reflected at the first reflective optical component 13a, and reflect the optical signal L2 to couple both the optical signals L1 and L2.

Also, on the optical axis of the fourth light source 12d, and at a position not overlapping with the optical axis Oa, there is arranged a second reflective optical component 13b for reflecting an optical signal L4 emitted from the fourth light source 12d so that its reflection surface is inclined at 45° to the optical axis of the fourth light source 12d. Here, the second reflective optical component 13b reflects the optical signal L4 to the optical axis Ob. The reflection direction of the optical signal L4 is on the opposite side (the upper side in the figure) to the receptacle 15 side, and parallel to the optical axis Oa.

In this optical axis Ob, there is arranged a second coupling optical component 14b for reflecting an optical signal L3 emitted from the third light source 12c so that its reflection surface is inclined at 45° to the optical axis Ob, and meets the optical axis of the third light source 12c. This allows the second coupling optical component 14b to reflect the optical signal L3, and transmit the optical signal L4 to couple both the optical signals L3 and L4.

Further, in the optical axis Ob, there is arranged a third reflective optical component 13c for reflecting an optical signal $l_{34}$ coupled at the second coupling optical component 14b so that its reflection surface is inclined at 45° to the optical axis Ob. It should be noted that the third reflective optical component 13c is arranged so as to be positioned between the optical axes of the second and third light sources 12b and 12c.

In the optical axis Oa, there is arranged a third coupling optical component 14c for reflecting an optical signal $l_{34}$ reflected at the third reflective optical component 13c so that its reflection surface is inclined at 45° to the optical axis Oa, and meets the optical axis of the optical signal $l_{34}$. This third coupling optical component 14c reflects the optical signal $l_{34}$, and transmits the optical signal $l_{12}$ to couple both the optical signals $l_{12}$ and $l_{34}$.

In this embodiment, first, the optical signal L1 of wavelength $\lambda_1$ emitted from the first light source 12a is reflected in the optical axis Oa direction at the first reflective optical component 13a, and then transmitted through the first coupling optical component 14a. The optical signal L2 of wavelength $\lambda_2$ emitted from the second light source 12b is reflected off the reflection surface of the first coupling optical component 14a in the optical axis Oa direction. The optical signal L1 transmitted through and the optical signal L2 reflected at the first coupling optical component 14a have substantially the same optical axis, and are emitted from the first coupling optical component 14a as the coupled optical signal $l_{12}$ with the 2 optical signals L1 and L2 coupled therein.

Also, the optical signal L4 of wavelength $\lambda_4$ emitted from the fourth light source 12d is reflected in the optical axis Ob direction at the second reflective optical component 13b, and then transmitted through the second coupling optical component 14b. The optical signal L3 of wavelength $\lambda_3$ emitted from the third light source 12c is reflected off the reflection surface of the second coupling optical component 14b in the optical axis Ob direction. The optical signal L3 reflected off and the optical signal L4 transmitted through the second coupling optical component 14b have substantially the same optical axis, and are emitted from the second coupling optical component 14b as the coupled optical signal $l_{34}$ with the 2 optical signals L3 and L4 coupled therein.

The coupled optical signal $l_{34}$ emitted from the second coupling optical component 14b is reflected off the third reflective optical component 13c perpendicularly in the direction of the third coupling optical component 14c.

The coupled optical signal $l_{34}$ reflected off the third reflective optical component 13c is reflected off the reflection surface of the third coupling optical component 14c along the optical axis Oa in the direction of the receptacle 15. Also, the coupled optical signal $l_{12}$ emitted from the first coupling optical component 14a is transmitted through the third coupling optical component 14c. The coupled optical signal $l_{12}$ transmitted through and the coupled optical signal $l_{34}$ reflected at the third coupling optical component 14c have substantially the same optical axis, and are emitted from the third coupling optical component 14c as a coupled optical signal $l_{1234}$ with the 2 coupled optical signals $l_{12}$ and $l_{34}$ coupled and 4-wavelength-multiplexed therein.

The coupled optical signal $l_{1234}$ is condensed to the end face of the ferrule 16 by the lens 17, and transmitted outwardly through an optical transmission line, etc. connected to the ferrule 16.

The optical transmitter 10 of this embodiment is capable of equalizing and wavelength-multiplexing each optical signal power of 4 different wavelength optical signals with the reflective optical components 13a-13c and the coupling optical components 14a-14c, whose reflectances are equal.

In this embodiment, to satisfy above equation (1) or (2), total reflection mirrors with a reflectance of 1 are used as the first-third reflective optical components 13a-13c, and half mirrors with a reflectance of 0.5 are used as the first-third coupling optical components 14a-14c, for example.

Also, in the optical transmitter 10, 4 tube-type laser diodes (Can-LDs) are used as the light sources 12a-12d, whose oscillation wavelengths are respectively 1276 nm ($\lambda_1$), 1300 nm ($\lambda_2$), 1324 nm ($\lambda_3$), and 1348 nm ($\lambda_4$), at a wavelength interval of substantially 24 nm.

After the optical signal L1 of wavelength $\lambda_1$ is totally reflected at the first reflective optical component 13a, 50% of its optical signal power is transmitted through the first coupling optical component 14a and 50% of its optical signal power through the third coupling optical component 14c. Therefore, in the coupled optical signal $l_{1234}$ with the optical signal L1 coupled to the other optical signals L2, L3 and L4, the optical signal power of the optical signal L1 is:

$$1 \times 0.5 \times 0.5 = 0.25,$$

which is 25% of optical signal power of the light source 12a.

For the optical signal L2 of wavelength $\lambda_2$, after 50% of its optical signal power is reflected at the first coupling optical component 14a, 50% of its optical signal power is transmitted through the third coupling optical component 14c. Therefore, in the coupled optical signal $l_{1234}$ with the optical signal L2 coupled to the other optical signals L1, L3 and L4, the optical signal power of the optical signal L2 is:

0.5×0.5=0.25, which is 25% of optical signal power of the light source 12b.

For the optical signal L3 of wavelength $\lambda_3$, 50% of its optical signal power is reflected at the second coupling optical component 14b, followed by total reflection at the third reflective optical component 13c, and transmission of 50% of its optical signal power through the third coupling optical component 14c. Therefore, in the coupled optical signal $l_{1234}$ with the optical signal L3 coupled to the other optical signals L1, L2 and L4, the optical signal power of the optical signal L3 is:

0.5×1×0.5=0.25, which is 25% of optical signal power of the light source 12c.

After the optical signal L4 of wavelength $\lambda_4$ is totally reflected at the second reflective optical component 13b, 50% of its optical signal power is transmitted through the second coupling optical component 14b, followed by total reflection at the third reflective optical component 13c, and transmission of 50% of its optical signal power through the third coupling optical component 14c. Therefore, in the coupled optical signal $l_{1234}$ with the optical signal L4 coupled to the other optical signals L1, L2 and L3, the optical signal power of the optical signal L4 is:

1×0.5×1×0.5=0.25, which is 25% of optical signal power of the light source 12d.

The optical signals L1-L4 respectively emitted from the light sources 12a-12d can be coupled at the same coupling ratio of substantially 25% of initial optical signal power emitted from the light sources, when transmitted through or reflected off the third coupling optical component 14c. In other words, the 4 wavelength optical signals L1-L4 can be coupled and wavelength-multiplexed so that the loss of each optical signal is equally 6 dB.

In this manner, in the optical transmitter 10, first, the 2 optical signals L1 and L2 are coupled together with one coupling optical component 14a, and the coupled optical signals $l_{12}$ and $l_{34}$ are coupled together with the same reflectance coupling optical component 14c, i.e., the optical components of the 2 kinds of reflectances are combined, thereby allowing easily the realization of optical signal wavelength-multiplexing at the same coupling ratio, with a small number of kinds of optical components, thus allowing manufacturing cost to be low.

In arranging the optical components 13a-13c and 14a-14c, the optical components are positioned and machined during machining of the chassis 11, so that they can easily be packaged to the chassis 11 with high precision.

In this embodiment, although the optical transmitter 10 for 4-wavelength-multiplexing and transmitting optical signals has been explained, the number of wavelength-multiplexing may be more than 4.

In the optical transmitter 10 of this embodiment, since half mirrors with a reflectance of 0.5 are used as the first-third coupling optical components 14a-14c and optical signals transmitted through and reflected off the half mirrors have the same optical signal power, design is possible without taking account of differentiating transmission and reflection during arrangement of the half mirrors. For that reason, in the optical transmitter 10, it is possible to arrange the optical components, combining arrangements of the optical components 21 and 22 shown in FIGS. 4 and 5.

Also the reflective optical components 13a-13c used in the optical transmitter 10 of this embodiment may be provided without limiting the number thereof for changing optical paths of optical signals because of its reflectance of 100%.

Figure 6:
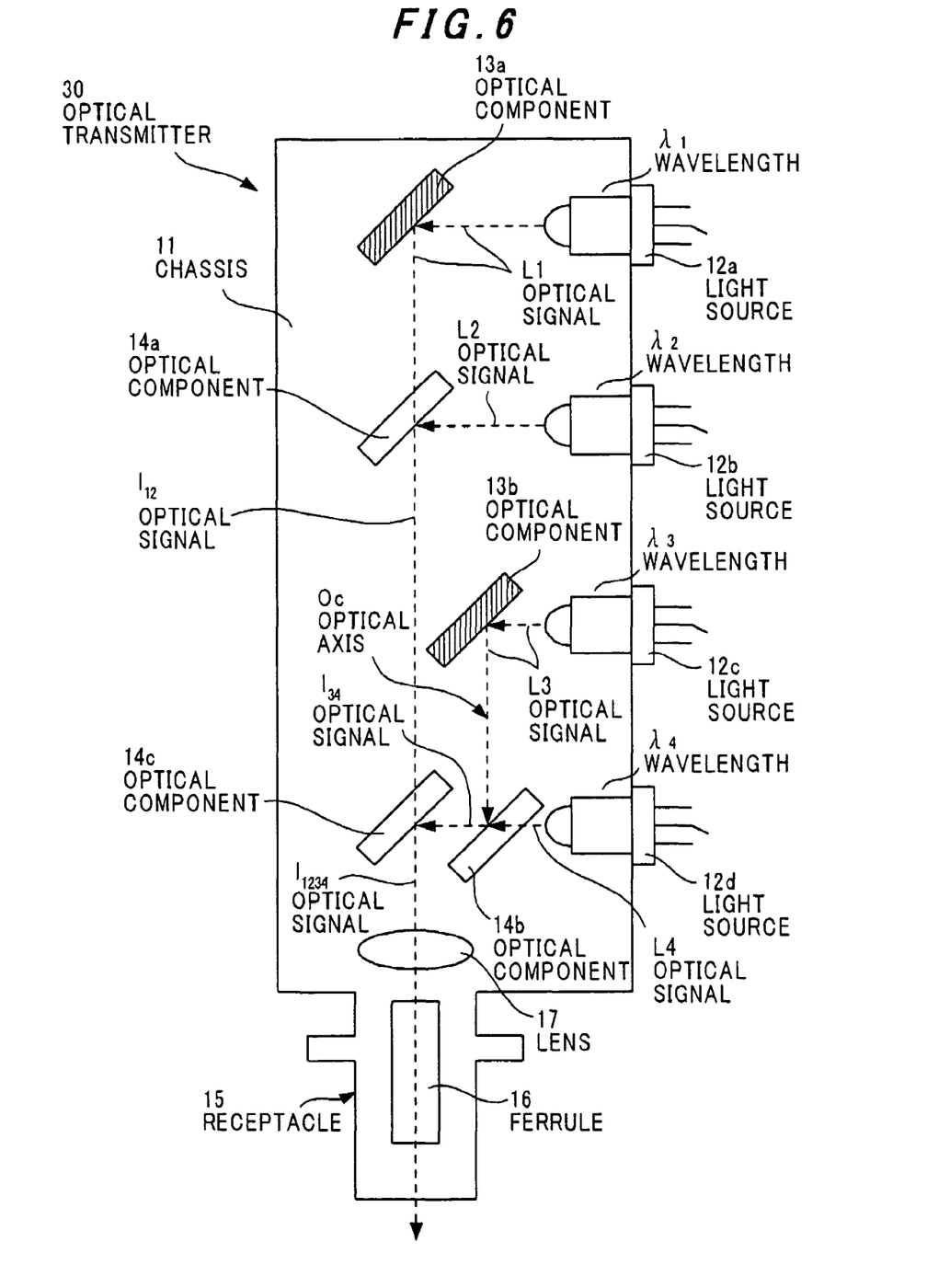
FIG. 6 is a schematic view illustrating an optical transmitter according to a second preferred embodiment of the invention.

FIG. 6 is a schematic view illustrating an optical transmitter according to a second preferred embodiment of the invention.

Although its basic structural portions are substantially the same as those of the above optical transmitter 10 of FIG. 3 and the same structural portions are denoted by the same characters as in FIG. 3, this optical transmitter is different from the optical transmitter 10 of the previous embodiment in that the positions of a second reflective optical component 13b, second and third coupling optical components 14b and 14c are changed, and that a third reflective optical component 13c is omitted.

Also, on the optical axis of the third light source 12c, and between the third light source 12c and the optical axis Oa, there is arranged a second reflective optical component 13b for reflecting an optical signal L3 emitted from the third light source 12c so that its reflection surface is inclined at 45° to the optical axis of the third light source 12c. Here, the second reflective optical component 13b reflects the optical signal L3 to the optical axis Oc. This reflection direction is on the receptacle 15 side (the lower side in the figure), and in the optical axis Oc parallel to the optical axis Oa.

In this optical axis Oc, there is arranged a second coupling optical component 14b for reflecting an optical signal L3 reflected off the second reflective optical component 13b so that its reflection surface is inclined at 45° to the optical axis Oc. Further, the second coupling optical component 14b is arranged so as to transmit an optical signal L4 of the fourth light source 12d, so that the optical axis of the fourth light source 12d meets the optical axis Oc on the reflection surface.

The third coupling optical component 14c is arranged so that its reflection surface is inclined at 45° to the optical axis Oa, and meets the optical axis of the coupled optical signal $l_{34}$.

In this second embodiment, similarly to the first embodiment, the optical signals L1 and L2 emitted from the first and second light sources 12a and 12b are coupled at the first coupling optical component 14a, and the coupled optical signal $l_{12}$ is transmitted through the third coupling optical component 14c.

The optical signal L3 emitted from the third light source 12c is reflected off the second reflective optical component 13b in the optical axis Oc direction, and then reflected off the second coupling optical component 14b perpendicularly in the direction of the third coupling optical component 14c.

The optical signal L4 emitted from the fourth light source 12d is transmitted through the second coupling optical component 14b.

The optical signal L3 reflected off and the optical signal L4 transmitted through the second coupling optical component 14b have substantially the same optical axis at the reflection surface of the second coupling optical component 14b, and are therefore emitted from the second coupling optical component 14b as the coupled optical signal $l_{34}$ with the 2 optical signals L3 and L4 coupled therein.

The coupled optical signal $l_{34}$ is reflected off the third coupling optical component 14c in the direction of the receptacle 15, and has at the reflection surface thereof substantially the same optical axis as that of the coupled optical signal $l_{12}$ transmitted through the first coupling optical component 14a and therefore becomes a coupled optical signal $l_{1234}$ with the 2 coupled optical signals $l_{12}$ and $l_{34}$ coupled and 4-wavelength-multiplexed therein.

In the optical transmitter 30 of this embodiment, after the optical signal L3 is totally reflected at the second reflective optical component 13b, 50% of its optical signal power is reflected off the second coupling optical component 14b, followed by reflection of 50% of its optical signal power at the third coupling optical component 14c. Therefore, in the coupled optical signal $l_{1234}$ with the optical signal L3 coupled to the other optical signals L1, L2 and L4, the optical signal power of the optical signal L3 is:

$$1 \times 0.5 \times 0.5 = 0.25,$$

which is 25% of optical signal power of the light source 12c.

For the optical signal L4, 50% of its optical signal power is transmitted through the second coupling optical component 14b, and 50% of its optical signal power is reflected at the third coupling optical component 14c. Therefore, in the coupled optical signal $l_{1234}$ with the optical signal L4 coupled to the other optical signals L1, L2 and L3, the optical signal power of the optical signal L4 is:

$$0.5 \times 0.5 = 0.25,$$

which is 25% of optical signal power of the light source 12d.

In the optical transmitter 30 of this embodiment, each optical signal power emitted and wavelength-multiplexed through the third coupling optical component 14c can also be coupled at the same coupling ratio of substantially 25% of initial optical signal power of the respective light sources 12a-12d.

Further, in the optical transmitter 30 of this embodiment, by arranging the first reflective optical component 13a and the first coupling optical component 14a in a positional relationship as shown in FIG. 4 and the second reflective optical component 13b and the second coupling optical component 14b in a positional relationship as shown in FIG. 5, the coupled optical signals $l_{12}$ and $l_{34}$ can be passed through and coupled together at the third coupling optical component 14c without using the third reflective optical component 13c (see FIG. 3).

Figure 7:
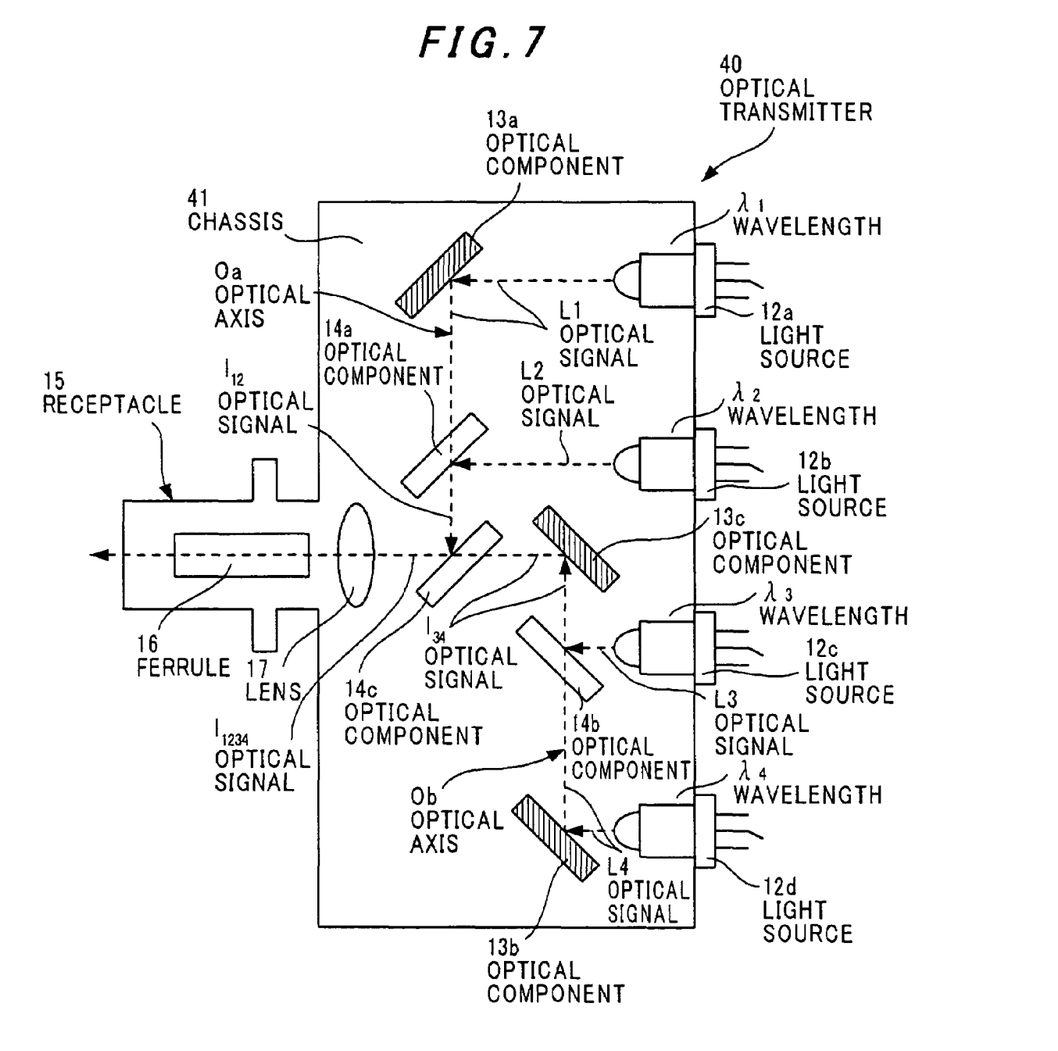
FIG. 7 is a schematic view illustrating an optical transmitter according to a third preferred embodiment of the invention.

FIG. 7 is a schematic view illustrating an optical transmitter according to a third preferred embodiment of the invention.

Although its basic structural portions are substantially the same as those of the above optical transmitter 10 of FIG. 3 and the same structural portions are denoted by the same characters as in FIG. 3, the difference between an optical transmitter 40 of this embodiment and the optical transmitter 10 of the first embodiment is that in the optical transmitter 10, the optical axes of the plurality of light sources 12a-12d are perpendicular to the optical axis of the ferrule 16, whereas in the optical transmitter 40, the optical axes of the plurality of light sources 12a-12d are substantially parallel to the optical axis of the ferrule 16. Accordingly, in the optical transmitter 40 of this embodiment, the arrangements of the third reflective optical component 13c and the third coupling optical component 14c are different from those in the optical transmitter 10 of the first embodiment.

Also, in the optical transmitter 10 of the first embodiment, total reflection mirrors with a reflectance of substantially 100% are used as the first-third reflective optical components 13a-13c, and half mirrors with a reflectance of substantially 50% are used as the coupling optical components 14a-14c, whereas in the optical transmitter 40 of this embodiment, the reflectances of the reflective optical components 13a-13c and the coupling optical components 14a-14c are set within a range which satisfies above equation (1).

The receptacle 15 is formed so that the optical axis of the ferrule 16 is positioned on the side (the left side in the figure) which faces the side of a chassis 41 provided with 4 light sources 12a-12d, and between the optical axes of the second and third light sources 12b and 12c. Accordingly, a lens 17 is arranged at a position for condensing an optical signal $l_{1234}$ to the end face of the ferrule 16 adjacent to the receptacle 15.

The third reflective optical component 13c for reflecting a coupled optical signal $l_{34}$ is arranged so that its reflection surface is inclined at 45° to the optical axis Ob, and meets the optical axis of the lens 17.

Also, in the optical axis Oa, there is arranged a third coupling optical component 14c for reflecting a coupled optical signal $l_{12}$ so that its reflection surface is inclined at 45° to the optical axis Oa, and meets the optical axis of the lens 17. This third coupling optical component 14c reflects the optical signal $l_{12}$, and transmits the optical signal $l_{34}$ to couple both the optical signals $l_{12}$ and $l_{34}$.

In the third embodiment, the coupled optical signal $l_{34}$ coupled at the second coupling optical component 14b is reflected off the third reflective optical component 13c perpendicularly in the direction of the third coupling optical component 14c.

The coupled optical signal $l_{34}$ is transmitted through the third coupling optical component 14c, while the coupled optical signal $l_{12}$ is reflected at the third coupling optical component 14c in the direction of the receptacle 15.

The coupled optical signal 112 reflected off and the coupled optical signal $l_{34}$ transmitted through the third coupling optical component 14c have substantially the same optical axis at the reflection surface of the third coupling optical component 14c, and are therefore emitted from the third coupling optical component 14c as a coupled optical signal $l_{1234}$ with the 2 coupled optical signals $l_{12}$ and $l_{34}$ coupled together therein. The coupled optical signal $l_{1234}$ is coupled to the lens 17.

Here is explained the change of optical signal power of the optical signals L1-L4 of each wavelength.

For the optical signal L1, its optical signal power is reflected off the first reflective optical component 13a by y times, is transmitted through the first coupling optical component 14a by (1−x) times, and is reflected off the third coupling optical component 14c by x times. Thus, in the coupled optical signal $l_{1234}$ with the optical signal L1 coupled to the other optical signals L2, L3 and L4, the optical signal power of the optical signal L1 is:

$$y \times (1-x) \times x = x/(1-x) \times (1-x) \times x = x^2,$$

which is $x^2$ times the optical signal power of the light source 12a.

For the optical signal L2, its optical signal power is reflected off the first coupling optical component 14a by x times, and is reflected off the third coupling optical component 14c by x times. Therefore, in the coupled optical signal $l_{1234}$ with the optical signal L2 coupled to the other optical signals L1, L3 and L4, the optical signal power of the optical signal L2 is:

$$x \times x = x^2,$$

which is $x^2$ times the optical signal power of the light source 12b.

For the optical signal L3, its optical signal power is reflected off the second coupling optical component 14b by x times, is reflected off the third reflective optical component 13c by y times, and is transmitted through the third coupling optical component 14c by (1−x) times. Therefore, in the coupled optical signal $l_{1234}$ with the optical signal L3 coupled to the other optical signals L1, L2 and L4, the optical signal power of the optical signal L3 is:

$$x \times y \times (1-x) = x \times x/(1-x) \times (1-x) = x^2,$$

which is $x^2$ times the optical signal power of the light source 12c.

For the optical signal L4, its optical signal power is reflected off the second reflective optical component 13b by y times, is transmitted through the second coupling optical component 14b by (1−x) times, is reflected off the third reflective optical component 13c by y times, and is transmitted through the third coupling optical component 14c by (1−x) times. Therefore, in the coupled optical signal $l_{1234}$ with the optical signal L4 coupled to the other optical signals L1, L2 and L3, the optical signal power of the optical signal L4 is:

$$y \times (1-x) \times y \times (1-x) = x/(1-x) \times (1-x) \times x/(1-x) \times (1-x) = x^2,$$

which is $x^2$ times the optical signal power of the light source 12d.

For the optical signals L1-L4 respectively emitted from the light sources 12a-12d, their optical signal power emitted from the third coupling optical component 14c can all be coupled at the same coupling ratio of $x^2$ times the initial optical signal power emitted from the light sources.

In the optical transmitter 10 of the third embodiment, there are arranged the first reflective optical component 13a and the first coupling optical component 14a as in the embodiment shown in FIG. 4 and the third reflective optical component 13c and the third coupling optical component 14c as in the embodiment shown in FIG. 5. For this reason, equalizing coupling ratios of the optical signals for wavelength-multiplexing using the 2 kinds of optical components requires the reflectances (x, y) of the 2 kinds of optical components to be (0.5, 1), respectively, so as to satisfy both equations (1) and (2).

In the optical transmitter 40 of the first embodiment, as in the embodiment shown in FIG. 4, all the optical components 13a-13c and 14a-14c are arranged so that 2 optical signals are coupled by causing one optical signal to reflect off the reflective optical component 21, and transmit through the coupling optical component 22, while causing the other optical signal to reflect off the coupling optical component 22.

This makes it possible to freely set the reflectances (x, y) of the 2 kinds of optical components which fall within a range satisfying equation (1), without limiting the combination of the reflectances (x, y) to be (0.5, 1).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmitter for coupling and wavelength-multiplexing optical signals, each with a different wavelength, comprising:

3 or more light sources for emitting parallel optical signals, each with a different wavelength; and a plurality of optical components including only 2 kinds of optical components, each with a different optical signal reflectance, wherein the plurality of the optical components are configured such that at least one of the 2 kinds of the optical components with the different optical signal reflectances is arranged in an optical path of each light source for coupling to one of the optical signals emitted from another of the light sources, wherein the reflectance or transmittance of each of the 2 kinds of optical components is set so that each optical signal has the same optical signal power when reflected off or transmitted through the optical components to be coupled together and output from the optical transmitter.

2. The optical transmitter according to claim 1, wherein:

the optical components comprise a reflective optical component and a coupling optical component for coupling together optical signals emitted from 2 light sources respectively to provide an optical coupled signal, and another reflective optical component and another coupling optical component for subsequently coupling the optical coupled signal with another optical coupled signal that is provided by coupling optical signals emitted from another 2 light sources to couple the optical coupled signal and the another optical signal into one.

3. The optical transmitter according to claim 2, wherein:

in coupling 2 optical signals together, a first optical signal is reflected off a first reflective optical component, and subsequently transmitted through a first coupling optical component, while a second optical signal is reflected off the first coupling optical component for being coupled to the first optical signal.

4. The optical transmitter according to claim 3, wherein:

respective reflectances y and x of the first reflective optical component and the first coupling optical component satisfy the following relation: $y = x/(1-x)/$, $0 \leq x \leq 0.5$.

5. The optical transmitter according to claim 2, wherein:

in coupling 2 optical signals together, a first optical signal is reflected off a first reflective optical component, and subsequently reflected off a first coupling optical component, while a second optical signal is transmitted through the first coupling optical component for being coupled to the first optical signal.

6. The optical transmitter according to claim 5, wherein:

respective reflectances y and x of the first reflective optical component and the first coupling optical component satisfy the following relation: $y = (1-x)/x$, $0.5 \leq x < 1$.

7. The optical transmitter according to claim 4, wherein:

the reflectance y of the first reflective optical component is 1; and the reflectance x of the first coupling optical component is 0.5.

8. The optical transmitter according to claim 6, wherein:

the reflectance y of the first reflective optical component is 1; and the reflectance x of the first coupling optical component is 0.5.

9. The optical transmitter according to claim 1, wherein:

respective optical signals of 4 light sources are combined into one for 4-wavelength multiplexing.

10. The optical transmitter according to claim 1, wherein the 3 or more light sources comprise first, second, third, and fourth light sources arranged in an array to emit first, second, third, and fourth parallel optical signal, each with a different wavelength; and further comprising:

a first reflective optical component configured to reflect the first optical signal of the first light source;

a first coupling optical component configured to reflect the second optical signal of the second light source adjacent to the first light source and to transmit the first optical signal reflected off the first reflective optical component to couple the first and the second optical signal;

a second reflective optical component configured to reflect the fourth optical signal of the fourth light source;

a second coupling optical component configured to reflect the third optical signal of the third light source adjacent to the fourth light source and to transmit the fourth optical signal reflected off the second reflective optical component to couple the third and the fourth optical signal;

a third reflective optical component configured to reflect the third and the fourth optical signal coupled by the second coupling optical component; and a third coupling optical component configured to transmit the first and the second optical signal coupled by the first coupling optical component, and to reflect the third and the fourth optical signal reflected off the third reflective optical component to couple the first to the fourth optical signals, wherein:

the reflectance of each of the first to the third reflective optical components is 1; and the reflectance of each of the first to the third coupling optical components is 0.5.

11. The optical transmitter according to claim 1, wherein the 3 or more light sources comprise first, second, third, and fourth light sources arranged in an array to emit respectively a first, second, third, and fourth parallel optical signal, each with a different wavelength; and further comprising:

a first reflective optical component configured to reflect the first optical signal of the first light source;

a first coupling optical component configured to reflect the second optical signal of the second light source adjacent to the first light source and to transmit the first optical signal reflected off the first reflective optical component to couple the first and the second optical signal;

a second reflective optical component configured to reflect the third optical signal of the third light source;

a second coupling optical component configured to transmit the fourth optical signal of the fourth light source adjacent to the third light source and to reflect the third optical signal reflected off the second reflective optical component to couple the third and the fourth optical signal; and a third coupling optical component configured to transmit the first and the second optical signal coupled by the first coupling optical component, and to reflect the third and the fourth optical signal coupled by the second coupling optical component to couple the first to the fourth optical signals, wherein:

the reflectance of each of the first and the second reflective optical components is 1; and the reflectance of each of the first to the third coupling optical components is 0.5.

12. The optical transmitter according to claim 1, wherein the 3 or more light sources comprise first, second, third, and fourth light sources arranged in an array to emit respectively a first, second, third, and fourth parallel optical signal, each with a different wavelength; and further comprising:

a first reflective optical component configured to reflect the first optical signal of the first light source;

a first coupling optical component configured to reflect the second optical signal of the second light source adjacent to the first light source and to transmit the first optical signal reflected off the first reflective optical component to couple the first and the second optical signal;

a second reflective optical component configured to reflect the fourth optical signal of the fourth light source;

a second coupling optical component configured to reflect the third optical signal of the third light source adjacent to the fourth light source and to transmit the fourth optical signal reflected off the second reflective optical component to couple the third and the fourth optical signal;

a third reflective optical component configured to reflect the third and the fourth optical signal coupled by the second coupling optical component; and a third coupling optical component configured to reflect the first and the second optical signal coupled by the first coupling optical component, and to transmit the third and the fourth optical signal reflected off the third reflective optical component to couple the first to the fourth optical signals.

* * * * *